United States Patent
Wang et al.

(10) Patent No.: US 10,577,278 B2
(45) Date of Patent: Mar. 3, 2020

(54) GLASS CERAMIC FOR EXCITATION OF HIGH-POWER SEMICONDUCTOR LIGHT SOURCE AND PREPARATION METHOD AND USE THEREOF

(71) Applicant: SUN YAT-SEN UNIVERSITY, Guangdong (CN)

(72) Inventors: Jing Wang, Guangdong (CN); Jinbo Yu, Guangdong (CN); Xuejie Zhang, Guangdong (CN); Shuaichen Si, Guangdong (CN); Qiongyun Liang, Guangdong (CN); Yu Chen, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 206 days.

(21) Appl. No.: 15/761,424

(22) PCT Filed: Apr. 14, 2017

(86) PCT No.: PCT/CN2017/080641
§ 371 (c)(1),
(2) Date: Mar. 19, 2018

(87) PCT Pub. No.: WO2018/170974
PCT Pub. Date: Sep. 27, 2018

(65) Prior Publication Data
US 2019/0367407 A1    Dec. 5, 2019

(30) Foreign Application Priority Data
Mar. 24, 2017    (CN) .......................... 2017 1 0181206

(51) Int. Cl.
*C03C 4/12* (2006.01)
*F21V 9/32* (2018.01)
(Continued)

(52) U.S. Cl.
CPC ................ *C03C 4/12* (2013.01); *C03B 25/02* (2013.01); *C03B 32/02* (2013.01); *C03C 10/00* (2013.01); *F21V 9/32* (2018.02); *C03C 2204/00* (2013.01)

(58) Field of Classification Search
None
See application file for complete search history.

(56) References Cited

U.S. PATENT DOCUMENTS

2017/0284633 A1* 10/2017 Chiu ....................... C03C 3/062

FOREIGN PATENT DOCUMENTS

| CN | 101696085 | 4/2010 |
| CN | 102584015 | 7/2012 |

(Continued)

*Primary Examiner* — Sharon E Payne
(74) *Attorney, Agent, or Firm* — JCIPRNET

(57) ABSTRACT

The present invention discloses a glass ceramic for excitation of high-power semiconductor light source. An expression of constitution of the glass ceramic is (1−x)A: xB, wherein x as a weight percentage of B, is ranging from 1% to 30%; A as a precursor glass, has a composition of $aSb_2O_3\text{-}bB_2O_3\text{-}cZnO\text{-}dM_2O$, a, b, c, d being molar percentages, a+b+c+d=100%, M among $M_2O$ represents an alkali metal, and $M_2O$ is an alkali metallic oxide or an alkali metallic carbonate; and B is a $YAG:Ce^{3+}$ fluorescent powder. The precursor glass provided by the present invention has a relatively low remelting temperature, without devitrification during the process of preparing the final products or absorption of blue light. The product glass ceramic has a luminous efficiency of 300 lm/W to 400 lm/W. A white light semiconductor light source is prepared by the product glass ceramic in combination with the high-power blue light semiconductor light source. A preparation method provided by the present invention has advantages such as low cost, excellent performances, and being green, pollution-free and suitable for the large-scale industrial production. The present (Continued)

invention can be applied in the field of illumination light source and display light source, such as head-lights of vehicles, searchlights, projectors and laser cinemas.

16 Claims, 3 Drawing Sheets

(51) Int. Cl.
*C03B 32/02* (2006.01)
*C03B 25/02* (2006.01)
*C03C 10/00* (2006.01)

(56) References Cited

FOREIGN PATENT DOCUMENTS

| | | |
|---|---|---|
| CN | 102745901 | 10/2012 |
| CN | 103183473 | 7/2013 |
| JP | 2007176748 | 7/2007 |

\* cited by examiner

GLASS CERAMIC FOR EXCITATION OF HIGH-POWER SEMICONDUCTOR LIGHT SOURCE AND PREPARATION METHOD AND USE THEREOF

CROSS-REFERENCE TO RELATED APPLICATION

This application is a 371 application of the international PCT application serial no. PCT/CN2017/080641, filed on Apr. 14, 2017, which claims the priority benefit of China application no. 201710181206.2, filed on Mar. 24, 2017. The entirety of each of the above-mentioned patent applications is hereby incorporated by reference herein and made a part of this specification.

BACKGROUND OF THE INVENTION

1. Field of the Invention

The present invention belongs to the technical field of high-power white light laser illumination and displaying, and particularly relates to a glass ceramic for excitation of a high-power semiconductor light source and a preparation method and use thereof.

2. Description of Related Art

High-power white light semiconductor light source is an advance technology of special illumination and displaying. Since a high-power semiconductor light source can produce large amounts of heat within a short time, making a temperature of an irradiated material reach over 200° C. These result to that packaging materials for a semiconductor white light source which is a traditional semiconductor light source packaged by organic materials such as silicone, can't endure such a high temperature. Therefore, the packaging materials can't achieve a higher lumen and brightness through being excited by a high-power semiconductor excitation light, or can't satisfy an impending need for special light sources either. To overcome these practical problems, a glass ceramic with functions of both light emitting and packaging comes to be a new choice for preparing the white light semiconductor light source. As well known, glass has advantages such as high thermal conductivity, adjustable refractive index, good thermal aging resistance and the like. If a glass with performances of adjustable refractive index, high transmittance in a visible light zone and low remelting temperature can be found and made into a YAG:Ce$^{3+}$-PiG composite material by being combined with a YAG:Ce$^{3+}$ fluorescent powder, with luminescence properties of the YAG:Ce$^{3+}$ fluorescent powder remaining unaffected, the YAG:Ce$^{3+}$-PiG composite material will have both fluorescent conversion and packaging functions, being a light-conversion packaging material practically applied in a high-power white light source. The high-power white light semiconductor light source prepared with the glass ceramic has greater application prospect in the field of special illumination and displaying, compared with a traditional low-power white light semiconductor light source.

SUMMARY OF THE INVENTION

An objective of the present invention is to aim at the deficiencies in the prior art, and provide a glass ceramic for excitation of a high-power semiconductor light source.

Meanwhile the present invention provides a preparation method for the glass ceramic for the excitation of the high-power semiconductor light source.

The present invention also provides use of the glass ceramic for the excitation of the high-power semiconductor light source in preparing high-power white light illumination and display light source.

The objectives of the present invention are achieved by following technical solutions:

The present invention provides a glass ceramic for the excitation of the high-power semiconductor light source. An expression of constitution of the glass ceramic is (1−x)A:xB, wherein x as a weight percentage of B, is ranging from 1% to 30%; A as a precursor glass, has a composition of $aSb_2O_3$-$bB_2O_3$-$cZnO$-$dM_2O$, a, b, c and d being molar percentages, a+b+c+d=100%, M among $M_2O$ represents an alkali metal, and $M_2O$ is an alkali metallic oxide or a alkali metallic carbonate; and B is a YAG:Ce$^3$ fluorescent powder.

Preferably, a:b:c:d=(40-60):(15-20):(5-20):(15-20).

Preferably, a:b:c:d=(50-60):(17.5-20):(5-10):(17.5-20).

Preferably, M is selected from a group consisting of Li, Na and K.

Meanwhile the present invention provides the preparation method for the glass ceramic for the excitation of the high-power semiconductor light source, including steps as follow:

S1. Mixing each constituent raw material of the precursor glass according to the molar percentages, followed by high-temperature melting, cooling and grinding to obtain a precursor glass powder;

S2. Mixing the precursor glass powder in S1 and the YAG:Ce fluorescent powder according to the weight percentage, followed by a melt reaction, holding, annealing and polishing to obtain the glass ceramic for the excitation of the high-power semiconductor light source.

Preferably, in S1, a temperature of the high-temperature melting is ranging from 900° C. to 1100° C., and a time for the high-temperature melting is ranging from 5 minutes to 60 minutes.

Preferably, a time for the grinding in S1 is ranging from 6 hours to 24 hours.

Preferably, in S2, a temperature of the melt reaction is ranging from 600° C. to 750° C., a time for the holding is ranging from 10 minutes to 50 minutes; a temperature of the annealing is ranging from 200° C. to 400° C., and a time for the annealing is ranging from 3 hours to 5 hours.

Meanwhile the present invention protects the use of the glass ceramic for the excitation of the high-power semiconductor light source in preparing the high-power white light illumination and display light source.

Further, the glass ceramic for the excitation of the high-power semiconductor light source is combined with a blue light semiconductor light source to prepare the high-power white light illumination and display light source.

Compared with the prior art, the present invention has advantages and beneficial effects as follow:

In the glass ceramic for the excitation of the high-power semiconductor light source provided by the present invention, the precursor glass has a relatively low fusion temperature, and has a refractive index ranging from 1.81 to 1.88. There is no devitrification in the precursor glass during a process of preparing final products, and the precursor glass itself has no absorption of the blue light. The glass ceramic provided by the present invention has a laser quantum efficiency ranging from 70% to 80%, and has a luminous efficiency of 300 lm/W to 400 lm/W. A white light semiconductor light source, which is prepared by the glass ceramic in combination with the high-power blue light semiconductor light source, has characteristics such as high light-conversion efficiency and excellent luminescence properties. The preparation method provided by the present invention has advantages such as low cost, excellent performances, and being green, pollution-free and suitable for the large-scale industrial production. The preparation method can be used in the field of illumination light source and display light source, such as head-lights for vehicles, searchlights, projectors, laser cinemas and the like, and it has great application prospects in the field of high-power white light illumination and display.

DETAILED DESCRIPTION OF THE PREFERRED EMBODIMENT

The present invention is further described below in combination with specific embodiments and drawings. However, the embodiments are not intended to limit the present invention in any manner. Unless specified, agents, methods and devices used in the present invention are conventional in the technical field.

Unless specified, agents and materials used in the present invention are commercially available.

Embodiment 1

A synthesis process of a glass ceramic with B:A=23:77

TABLE 1

Constitution of raw materials and the synthesis process of a precursor glass in Embodiment 1

| Raw materials | $Sb_2O_3$ | $H_3BO_3$ | ZnO | $K_2CO_3$ |
|---|---|---|---|---|
| Mass (g) | 17.4911 | 2.1642 | 0.4070 | 2.4186 |

Figure 1:
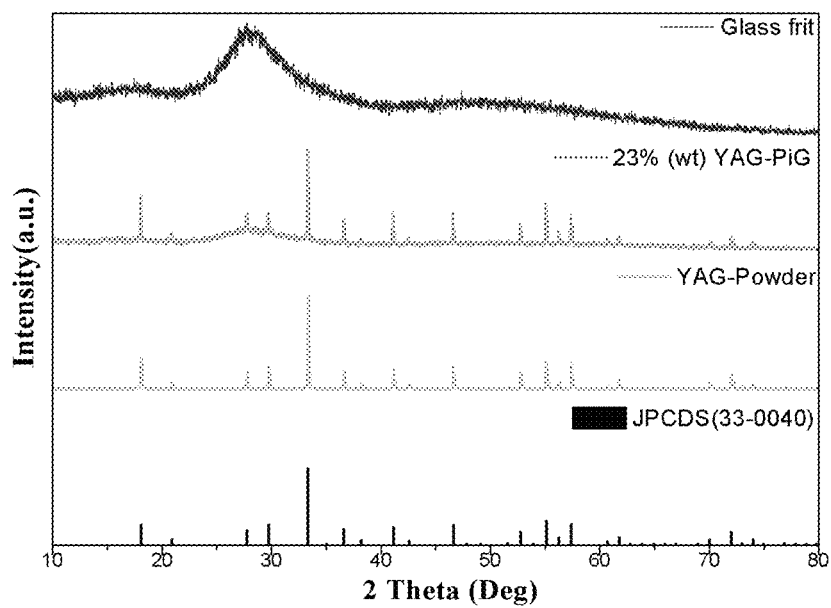
FIG. 1 is XRD patterns of a precursor glass and a YAG:$Ce^{3+}$-PiG sample prepared in Embodiment 1.

A constitution of A was a:b:c:d=60:17.5:5:17.5, shown as the corresponding mass in Table 1. Analytically pure diantimony trioxide ($Sb_2O_3$), boric acid ($H_3BO_3$), zinc oxide (ZnO) and potassium carbonate ($K_2CO_3$) were precisely weighed according to Table 1. The raw materials precisely weighed were transferred into a crucible after being grinded for 1 to 2 hours in an agate mortar, and then were melted in a furnace for 30 minutes at 900° C. Molten glass was poured into a graphite mold for quenching. Glass cullet was taken out and grinded for 6 hours to obtain an A powder standby. The B powder and the A powder was weighed according to a mass ratio of 23:77, and then was poured into the crucible after being grinded sufficiently for 0.5 hour in the agate mortar, followed by being melted in the furnace for 30 minutes at 700° C. Then the molten glass was poured into a preheated graphite mold for molding, and at last was annealed in the furnace for 4 hours at 350° C., and thus a sample was obtained. The sample was cut into an appropriate thickness by a diamond wire cutting machine, and was polished to mirror plane on both sides, and thus a YAG:$Ce^{3+}$-PiG glass ceramic for packaging complying with requirements was obtained. Particularly, FIG. 1 is XRD patterns of the synthesized YAG:$Ce^{3+}$-PiG glass ceramic, wherein an XRD curve of a YAG:$Ce^{3+}$ fluorescent powder is shown as Glass fit and the standard card PDF #33-0040 is shown as JPCDS (33-0040). It can be observed that there is no new crystal generated in a glass matrix during the synthesis, and crystal diffraction peaks of the YAG:$Ce^{3+}$-PiG glass ceramic are in one-to-one correspondence with diffraction peaks of the YAG:Ce fluorescent powder and the standard card of the YAG, indicating that the synthesized YAG:$Ce^{3+}$-PiG glass ceramic (a glass ceramic for excitation of a high-power semiconductor light source) comprises the YAG:Ce fluorescent powder.

Embodiment 2: A Synthesis Process of a Glass Ceramic with B:A=5:95

TABLE 2

Constitution of the raw materials and the synthesis process of a precursor glass in Embodiment 2

| Raw materials | $Sb_2O_3$ | $H_3BO_3$ | ZnO | $K_2CO_3$ |
|---|---|---|---|---|
| Mass (g) | 16.0335 | 2.4733 | 0.4070 | 2.7641 |

Figure 2:
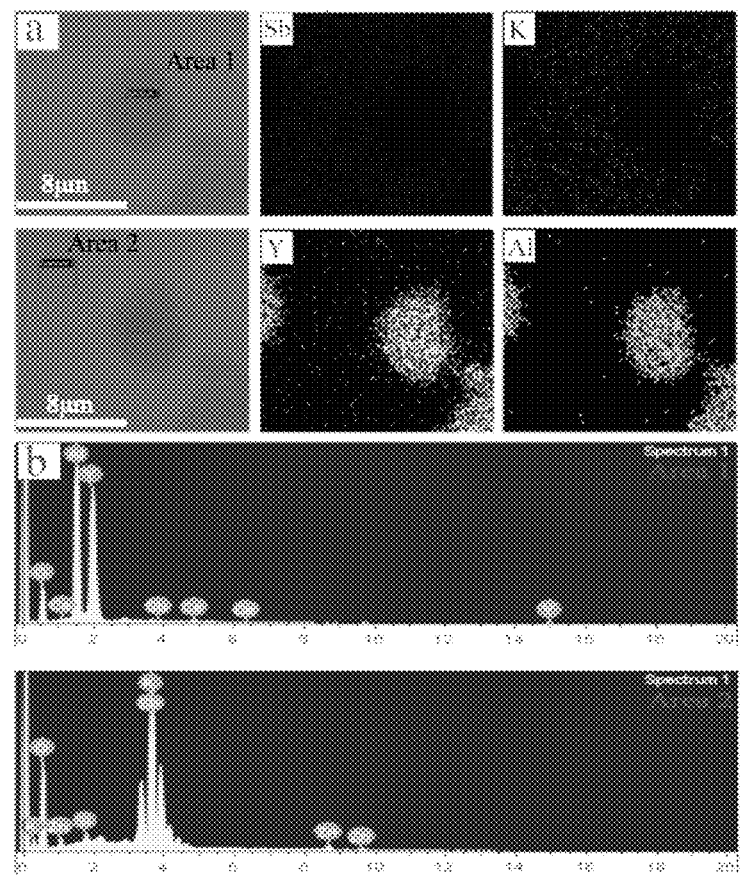
FIG. 2 is SEM patterns of a YAG:$Ce^{3+}$-PiG sample prepared in Embodiment 2.

The constitution of A was a:b:c:d=55:20:5:20, shown as the corresponding mass in Table 2. Analytically pure diantimony trioxide ($Sb_2O_3$), boric acid ($H_3BO_3$), zinc oxide (ZnO) and potassium carbonate ($K_2CO_3$) were precisely weighed according to table 2. The raw materials precisely weighed were transferred into the crucible after being grinded for 1 to 2 hours in the agate mortar, and then were melted in the furnace for 15 minutes at 950° C. Molten glass was poured into the graphite mold for quenching. Glass cullet was taken out and grinded for 6 hours to obtain an A powder standby. The B powder and the A powder was weighed according to a mass ratio of 5:95, and then was poured into the crucible after being grinded sufficiently for 0.5 hour in the agate mortar, followed by being melted in the furnace for 30 minutes at 650° C. Then the molten glass was poured into the preheated graphite mold for molding, and at last was annealed in the furnace for 3 hours at 350° C., and thus a sample was obtained. The sample was cut into an appropriate thickness by the diamond wire cutting machine and was polished to mirror plane on both sides, and thus the YAG:$Ce^{3+}$-PiG glass ceramic for packaging complying with the requirements was obtained. FIG. 2 is SEM patterns of the sample. FIG. 2*a* is SEM graphs where particle-like parts in dark are the YAG:$Ce^3$ fluorescent powder, while parts in light are the glass raw materials. FIG. 2*b* is the corresponding EDS energy spectrum data of Area 1 and Area 2 in FIG.

2a. Constituent elements of the Area 1 part are Y, Al, O, Ce, etc., representing $Y_3Al_5O_{12}:Ce^{3+}$, without a composition of glass. The constituent elements of the Area 2 part are Sb, K, Zn, O, etc., which are the constituent elements of glass, without $Y_3Al_5O_{12}:Ce^{3+}$. It's indicated that the YAG:Ce$^{3+}$ fluorescent powder existed well in the glass without any erosion or destruction.

Embodiment 3: A Synthesis Process of a Glass Ceramic with B:A=5:95

TABLE 3

Constitution of the raw materials and the synthesis process of a precursor glass in Embodiment 3

| Raw materials | $Sb_2O_3$ | $H_3BO_3$ | ZnO | $K_2CO_3$ |
|---|---|---|---|---|
| Mass (g) | 13.1183 | 2.1642 | 1.6282 | 1.8548 |

The constitution of A was a:b:c:d=60:17.5:5:17.5, shown as the corresponding mass in Table 3. Analytically pure diantimony trioxide ($Sb_2O_3$), boric acid ($H_3BO_3$), zinc oxide (ZnO) and sodium carbonate ($Na_2CO_3$) were precisely weighed according to Table 3. The raw materials precisely weighed were transferred into the crucible after being grinded for 1 to 2 hours in the agate mortar, and then were melted in the furnace for 30 minutes at 920° C. Molten glass was poured into the graphite mold for quenching. Glass cullet was taken out and grinded for 6 hours to obtain an A powder standby. The B powder and the A powder was weighed according to a mass ratio of 5:95, and then was poured into the crucible after being grinded sufficiently for 0.5 hour in the agate mortar, followed by being melted in the furnace for 30 minutes at 700° C. Then the molten glass was poured into the preheated graphite mold for molding, and at last was annealed in the furnace for 4 hours at 350° C., and thus a sample was obtained. The sample was cut into an appropriate thickness by the diamond wire cutting machine and was polished to mirror plane on both sides, and thus the YAG:Ce$^{3+}$-PiG glass ceramic for packaging complying with the requirements was obtained.

Embodiment 4: A Synthesis Process of a Glass Ceramic with B:A=5:95

TABLE 4

Constitution of the raw materials and the synthesis process of a precursor glass in Embodiment 4

| Raw materials | $Sb_2O_3$ | $H_3BO_3$ | ZnO | $K_2CO_3$ |
|---|---|---|---|---|
| Mass (g) | 11.6607 | 2.4733 | 1.6282 | 2.7641 |

Figure 3:
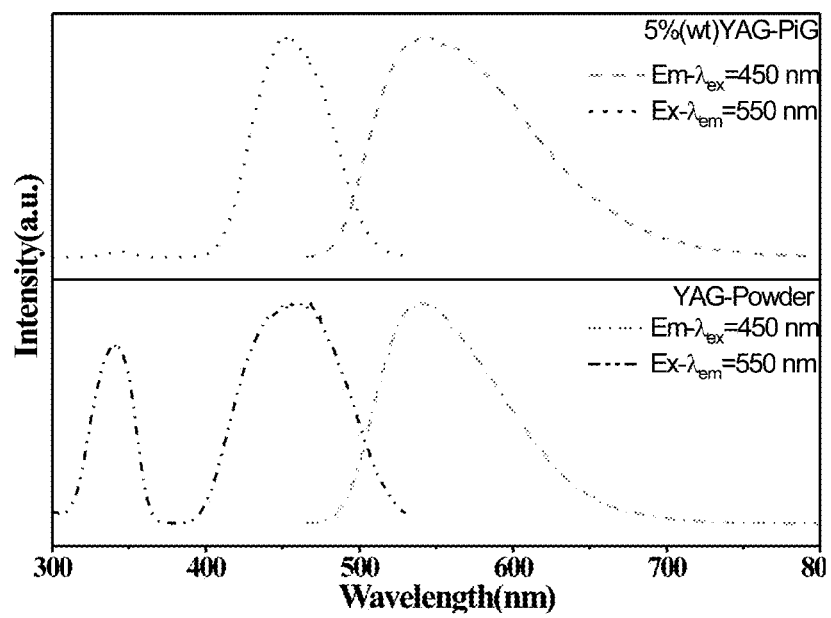
FIG. 3 is excitation and emission spectrums of the YAG:$Ce^{3+}$-PiG prepared in Embodiment 4 (the excitation and emission spectrums of a YAG:$Ce^{3+}$ fluorescent powder and a YAG:$Ce^{3+}$-PiG glass ceramic respectively, wherein an excitation wavelength is 450 nm and a monitoring emission wavelength is 550 nm).

The constitution of A was a:b:c:d=55:20:5:20, shown as the corresponding mass in Table 4. Analytically pure diantimony trioxide ($Sb_2O_3$), boric acid ($H_3BO_3$), zinc oxide (ZnO) and potassium carbonate ($K_2CO_3$) were precisely weighed according to Table 4. The raw materials precisely weighed were transferred into the crucible after being grinded for 1 to 2 hours in the agate mortar, and then were melted in the furnace for 15 minutes at 950° C. Molten glass was poured into a graphite mold for quenching. Glass cullet was taken out and grinded for 6 hours to obtain an A powder standby. The B powder and the A powder was weighed according to a mass ratio of 5:95, and then was poured into an aluminum oxide crucible after being grinded sufficiently for 0.5 hour in the agate mortar, followed by being melted in the furnace for 30 minutes at 700° C. The molten glass was poured into the preheated graphite mold for molding, and at last was annealed in the furnace for 4 hours at 350° C., and thus a sample was obtained. The sample was cut into an appropriate thickness by the diamond wire cutting machine and was polished to mirror plane on both sides, and thus the YAG:Ce$^{3+}$-PiG glass ceramic for packaging complying with the requirements was obtained. FIG. 3 is excitation and emission spectrums of the YAG:Ce$^{3+}$-PiG glass ceramic. The emission spectrum of the YAG:Ce$^{3+}$-PiG glass ceramic is almost consistent with the emission spectrum of a YAG:Ce$^{3+}$ fluorescent powder. The excitation spectrum of the YAG:Ce$^{3+}$-PiG glass ceramic has a slight difference with the excitation spectrum of the YAG:Ce$^{3+}$ fluorescent powder, since the glass matrix has an absorption of light of which a wavelength is less than 400 nm.

Embodiment 5: A Synthesis Process of a Glass Ceramic with B:A=23:77

TABLE 5

Constitution of the raw materials and the synthesis process of a precursor glass in Embodiment 5

| Raw materials | $Sb_2O_3$ | $H_3BO_3$ | ZnO | $K_2CO_3$ |
|---|---|---|---|---|
| Mass (g) | 14.5759 | 2.4733 | 0.8141 | 2.7641 |

Figure 4:
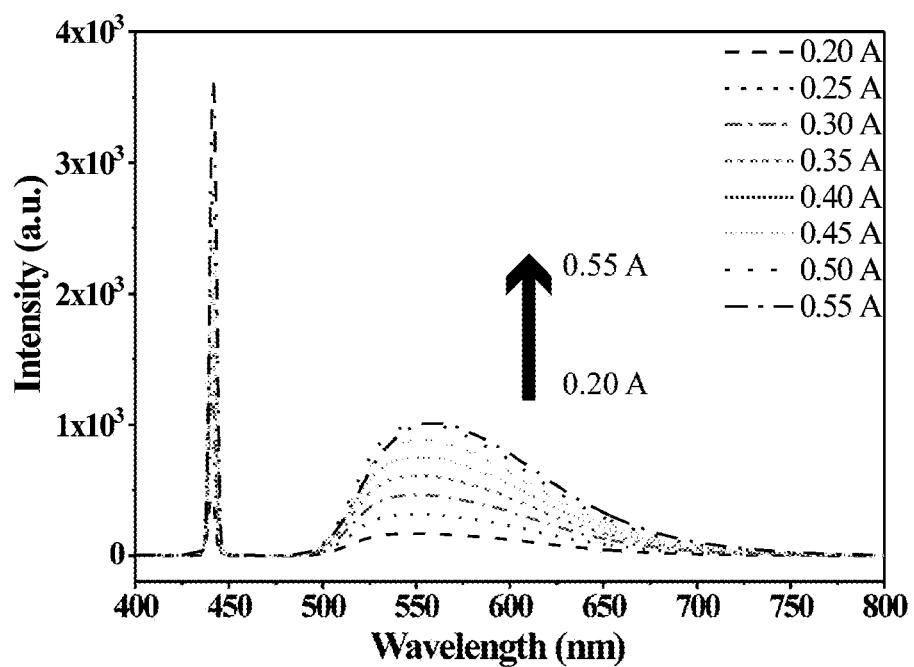
FIG. 4 is electroluminescence spectrograms of a white light laser light source prepared by the YAG:$Ce^{3+}$-PiG in combination with a high-power blue light semiconductor light source in Embodiment 5.
Figure 5:
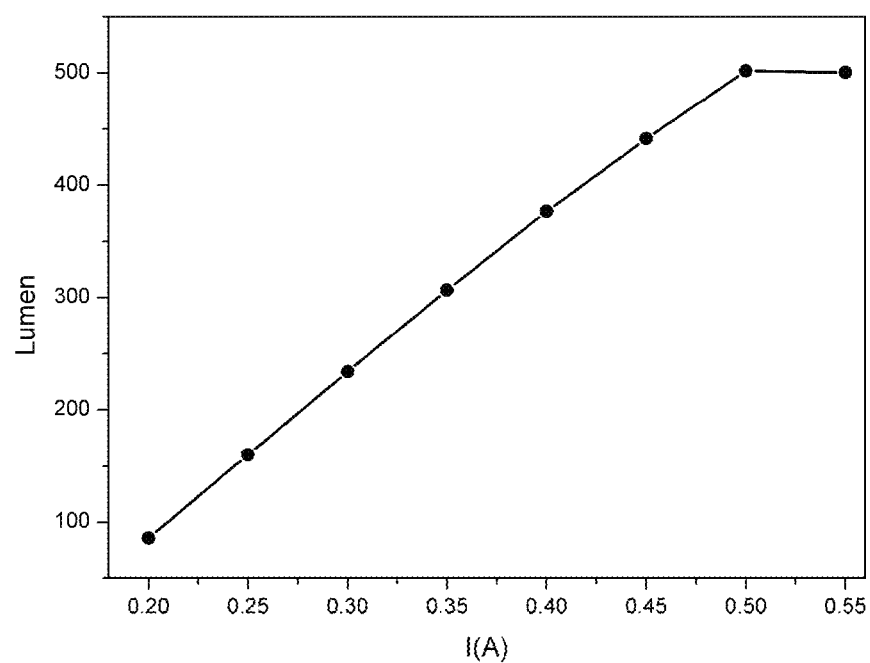
FIG. 5 is a current variation curve of a lumen versus a laser drive current, for the white light laser light source prepared by the YAG:$Ce^{3+}$-PiG in combination with the high-power blue light semiconductor light source in Embodiment 5.

The constitution of A was a:b:c:d=50:20:10:20, shown as the corresponding mass in Table 5. Analytically pure diantimony trioxide ($Sb_2O_3$), boric acid ($H_3BO_3$), zinc oxide (ZnO) and potassium carbonate ($K_2CO_3$) were precisely weighed according to Table 5. The raw materials precisely weighed were transferred into the crucible after being grinded for 1 to 2 hours in the agate mortar, and then were melted in the furnace for 20 minutes at 930° C. Molten glass was poured into the graphite mold for quenching. Glass cullet was taken out and grinded for 6 hours to obtain an A powder standby. The B powder and the A powder was weighed according to a mass ratio of 23:77, and then was poured into the aluminum oxide crucible after being grinded sufficiently for 0.5 hour in the agate mortar, followed by being melted in the furnace for 30 minutes at 690° C. The molten glass was poured into the preheated graphite mold for molding, and at last was annealed in the furnace for 4 hours at 350° C., and thus a sample was obtained. The sample was cut into an appropriate thickness by the diamond wire cutting machine and was polished to mirror plane on both sides, and thus the YAG:Ce$^{3+}$-PiG glass ceramic for packaging complying with the requirements was obtained. FIG. 4 and FIG. 5 are test data of the sample tested on a laser semiconductor light source, wherein the spectrograms in FIG. 4 is electroluminescence spectrograms at different drive currents, and FIG. 5 is lumen variation curves corresponding to different drive currents. Specific data is shown in Table 6.

TABLE 6

Efficiency test of the sample under excitation of a blue light semiconductor light source

| Sample | Embodiment 5 |
|---|---|
| Laser internal efficiency | 80.1% |
| Luminous efficiency lm/W | 366.93 |
| Absorbance of blue light | 93.6% |

Embodiment 6: A Synthesis Process of a Glass Ceramic with B:A=23:77

TABLE 7

Constitution of the raw materials and the synthesis process of precursor glass in Embodiment 6

| Raw materials | $Sb_2O_3$ | $H_3BO_3$ | ZnO | $Li_2CO_3$ |
|---|---|---|---|---|
| Mass (g) | 14.5759 | 2.4733 | 0.8141 | 1.4778 |

The constitution of A was a:b:c:d=50:20:10:20, shown as the corresponding mass in Table 7. Analytically pure diantimony trioxide ($Sb_2O_3$), boric acid ($H_3BO_3$), zinc oxide (ZnO) and lithium carbonate ($Li_2CO_3$) were precisely weighed according to Table 7. The raw materials precisely weighed were transferred into the crucible after being grinded for 1 to 2 hours in the agate mortar, and then were melted in the furnace for 20 minutes at 930° C. Molten glass was poured into the graphite mold for quenching. Glass cullet was taken out and grinded for 6 hours to obtain an A powder standby. The B powder and the A powder was weighed according to a mass ratio of 23:77, and then was poured into the aluminum oxide crucible after being grinded sufficiently for 0.5 hour in the agate mortar, followed by being melted in the furnace for 30 minutes at 690° C. The molten glass was poured into the preheated graphite mold for molding, and at last was annealed in the furnace for 4 hours at 350° C., and thus a sample was obtained. The sample was cut into an appropriate thickness by the diamond wire cutting machine and was polished to mirror plane on both sides, and thus the YAG:$Ce^{3+}$-PiG glass ceramic for packaging complying with the requirements was obtained.

What is claimed:

1. A glass ceramic for excitation of a high-power semiconductor light source, comprising,
an expression of constitution of the glass ceramic is (1−x)A: xB,
wherein x as a weight percentage of B, is ranging from 1% to 30%; A as a precursor glass, has a composition of a$Sb_2O_3$-b$B_2O_3$-cZnO-d$M_2O$, a, b, c and d being molar percentages, a+b+c+d=100%, M among $M_2O$ represents an alkali metal, and $M_2O$ is an alkali metallic oxide or an alkali metallic carbonate; and B is a YAG:$Ce^{3+}$ fluorescent powder.

2. The glass ceramic for excitation of the high-power semiconductor light source according to claim 1, wherein a:b:c:d=(40-60):(15-20):(5-20):(15-20).

3. The glass ceramic for excitation of the high-power semiconductor light source according to claim 2, wherein a:b:c:d=(50-60):(17.5-20):(5-10):(17.5-20).

4. The glass ceramic for excitation of the high-power semiconductor light source according to claim 1, wherein M is selected from a group consisting of Li, Na and K.

5. A preparation method for the glass ceramic for excitation of the high-power semiconductor light source according to claim 1, the preparation method comprises steps as follow:
S1. Mixing each constituent raw material of a precursor glass according to molar percentages, followed by high-temperature melting, cooling and grinding to obtain a precursor glass powder;
S2. Mixing the precursor glass powder in S1 with a YAG:$Ce^{3+}$ fluorescent powder according to a weight percentage, followed by a melt reaction, holding, annealing and polishing to obtain the glass ceramic for the excitation of the high-power semiconductor light source.

6. The preparation method according to claim 5, wherein in S1, a temperature of the high-temperature melting is ranging from 900° C. to 1100° C., and a time for the high-temperature melting is ranging from 5 minutes to 60 minutes.

7. The preparation method according to claim 5, wherein in S1, a time for the grinding is ranging from 6 hours to 24 hours.

8. The preparation method according to claim 5, wherein in S2, a temperature of the melt reaction is ranging from 600° C. to 750° C., a time for the holding is ranging from 10 minutes to 50 minutes; a temperature of the annealing is ranging from 200° C. to 400° C., and a time for the annealing is ranging from 3 hours to 5 hours.

9. Use of the glass ceramic for the excitation of the high-power semiconductor light source according to claim 1 in preparing a high-power white light illumination and display light source.

10. The use according to claim 9, wherein the glass ceramic for the excitation of the high-power semiconductor light source is combined with a blue light semiconductor light source to prepare the high-power white light illumination and display light source.

11. Use of the glass ceramic for the excitation of the high-power semiconductor light source according to claim 2 in preparing a high-power white light illumination and display light source.

12. Use of the glass ceramic for the excitation of the high-power semiconductor light source according to claim 3 in preparing a high-power white light illumination and display light source.

13. Use of the glass ceramic for the excitation of the high-power semiconductor light source according to claim 4 in preparing a high-power white light illumination and display light source.

14. The use according to claim 11, wherein the glass ceramic for the excitation of the high-power semiconductor light source is combined with a blue light semiconductor light source to prepare the high-power white light illumination and display light source.

15. The use according to claim 12, wherein the glass ceramic for the excitation of the high-power semiconductor light source is combined with a blue light semiconductor light source to prepare the high-power white light illumination and display light source.

16. The use according to claim 13, wherein the glass ceramic for the excitation of the high-power semiconductor light source is combined with a blue light semiconductor light source to prepare the high-power white light illumination and display light source.

* * * * *